May 8, 1945.   W. S. PIERCE, JR   2,375,322
PRECISION PIVOT BEARING
Filed June 2, 1944
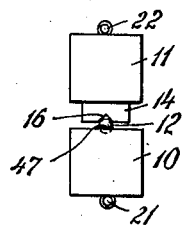
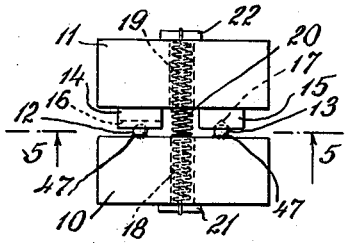
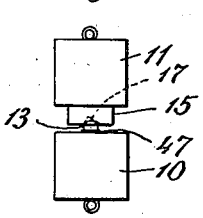
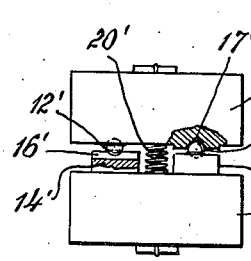
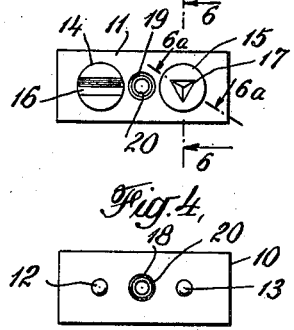
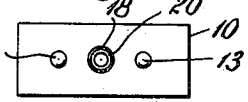
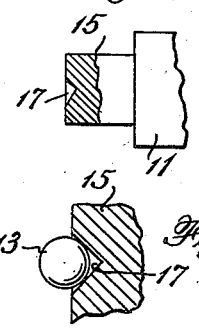
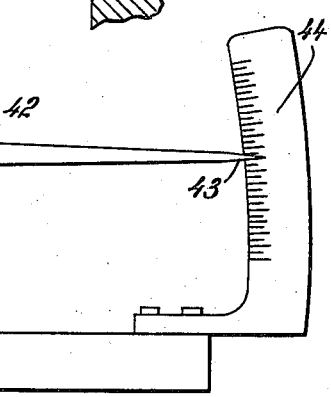
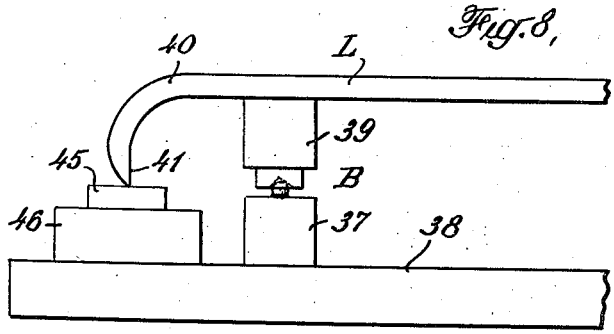
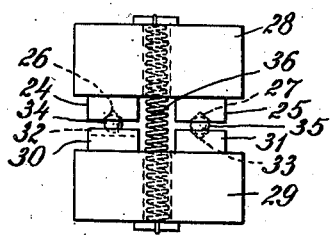
INVENTOR.
Winslow S. Pierce
BY
ATTORNEYS Patented May 8, 1945

2,375,322

UNITED STATES PATENT OFFICE 2,375,322

PRECISION PIVOT BEARING

Winslow S. Pierce, Jr., Dublin, N. H., assignor to Miniature Precision Bearings, Keene, N. H., a partnership consisting of Winslow S. Pierce, Jr., Dublin, and Arthur N. Daniels, Hancock, N. H.

Application June 2, 1944, Serial No. 538,440

11 Claims. (Cl. 308—2)

This invention relates to hinge or pivot bearings and more particularly concerns an improved and simplified bearing capable of smooth and precisely true turning movement about a fixed axis.

In many forms of instruments and mechanisms for making precise measurements, it is essential that minute movements or changes in positions of parts be multiplied considerably to facilitate the taking of readings or for other purposes. Such multiplication is generally accomplished by mechanism including one or more levers, each pivoted to turn about a fulcrum and having arms of unequal length. In order that such a lever may produce a considerable multiplication of movement, the fulcrum or pivot point must be located quite close to the end of the short lever arm. As a consequence, any departure from true rotational movement of the pivot about a true axis is greatly magnified at the end of the long lever arm, and accurate and precise multiplication of movement is impossible unless a pivot bearing capable of precisely true movement about a fixed axis is employed.

It is the object of the present invention to provide an extremely simple and effective hinge or pivot joint or bearing which turns precisely and accurately about a fixed line axis. More particularly, the invention contemplates a pivot bearing which turns freely and smoothly without any departure of either of its parts from a true rotation about its axis and without any end play or axial movement. Other specific objects and advantages of the invention will be apparent from the following description of a typical embodiment thereof.

The above and other objects of the invention are carried out by providing a pivot having two axially spaced bearing points each formed by the engagement of a spherical surface with a recess comprising a plurality of angularly disposed plane surfaces. The recess engaged by one of the spherical parts comprises the plane angularly disposed divergent walls of a groove or slot approximately aligned with the bearing axis. The recess engaged by the other spherical part comprises the three plane sides of a triangular pyramidal depression. The spherical surfaces are held in firm engagement with the recess surfaces by gravity or by other suitable biasing means and the bearing turns smoothly and accurately through a limited angle about a line axis passing precisely through the centers of the spherical parts. End play is prevented by the triangular form of one of the recesses, and the fact that the other recess is a groove extending substantially parallel to the bearing axis obviates any necessity for equal spacing between the spherical parts and the recesses they engage. In describing the invention in detail, reference will be made to the accompanying drawing in which certain typical embodiments thereof have been illustrated. In the drawing:

Fig. 1 is a side elevation of a bearing embodying the invention;

Fig. 2 is an end elevation of the bearing shown in Fig. 1;

Fig. 3 is an opposite end elevation of the bearing shown in Fig. 1;

Fig. 4 is a plan view of the lower part of the bearing;

Fig. 5 is a plan view of the upper part of the bearing taken along the line 5—5 of Fig. 1 and viewed in the direction of the arrows;

Fig. 6 is a sectional view on an enlarged scale taken along the line 6—6 of Fig. 5 and viewed in the direction of the arrows;

Fig. 6a is a sectional view on an enlarged scale taken along the line 6—6a of Fig. 5 and viewed in the direction of the arrows;

Fig. 7 is an elevation, partly in section, of a modified form of pivot bearing embodying the invention;

Fig. 8 is an elevation of a motion multiplying mechanism in which a bearing embodying the invention is employed; and Fig. 9 is an elevation of a bearing embodying further modification of the invention.

Referring to Figs. 1–6a inclusive, the embodiment of my invention there illustrated includes a lower block 10 and an upper block 11, the blocks having oppositely disposed adjacent faces as shown. Two spherical elements, 12 and 13, which may comprise bearing balls, are suitably secured at spaced points to the upper face of the lower block 10 by suitable means such as soldering or welding as illustrated at 47. Each of the spherical elements 12 and 13 protrudes above the face of the block 10 by considerably more than half its diameter.

The under face of the upper block 11 carries two substantially cylindrical posts 14 and 15 which are spaced from center to center by approximately the interval between the spherical elements 12 and 13. The posts 14 and 15 may be formed integral with the block 11 or secured thereto in any suitable known manner.

A groove 16 formed of two plane convergent surfaces extends across the lower end of the post 14 and lies substantially parallel to the axis of the bearing, which comprises a line through the centers of the spherical elements 12 and 13. This arrangement of the groove 16 parallel to the bearing axis is not critical, and the groove may depart considerably from such parallelism so long as it extends generally in the direction of the bearing axis. The groove 16 is preferably of sufficient width at its mouth so that the spherical element 12 protrudes into the groove and engages the plane convergent surfaces thereof beyond their edges, as shown in Fig. 3.

A depression 17 having three plane convergent sides is formed in the lower end of the post 15. As shown, the depression 17 may be in triangular pyramidal form. The spherical element 13 extends into the depression 17 and engages its three plane walls below the face of the post 15 as best shown in Fig. 6a.

The two parts of the bearing may be held in engagement by gravity, but it is generally preferred to employ a spring or other flexible or resilient means for this purpose. In the disclosed illustrative embodiment, aligned openings 18 and 19 are formed through the blocks 10 and 11 between the interengaging bearing parts and a tensioned spring 20 extends through these openings and is held in place by any suitable means illustrated as pegs 21 and 22 passing through end loops of the spring 20 and engaging the outer faces of the blocks 10 and 11 respectively.

In operation, the blocks 10 and 11 turn relative to each other on an axis comprising a straight line passing through the centers of the spherical elements 12 and 13. The depression 17 prevents end play or axial relative movement of the parts, and the angular convergent disposition of the plane walls of the depression 17 and the groove 16 insures a tight but smoothly turning frictional engagement between the bearing parts. The combination of the groove and the three-sided depression avoids any necessity for precise spacing or disposition of these recesses or precise alignment of the groove 16 with the depression 17. This combination also makes it unnecessary to accurately space the spherical elements 12 and 13 with relation to the spacing of the recesses 16 and 17.

It is not essential to the invention in its broader aspects that the two spherical elements be secured to the same block. Thus, as illustrated in Fig. 7, one spherical element 12' may be secured to the upper block 11' and the other spherical element 13' may be secured to the face of a post 23 fixed to the lower block 10'. A post 14' fixed to the lower block 10' has a plane sided groove 16' engaged by the spherical element 12', and a depression 17' having three plane convergent surfaces is formed in a short post 15' on the upper bearing block 11'. A tensioned spring 20' holds the bearing parts together and the bearing operates in the manner described above.

In a further modification embodying the invention, illustrated in Fig. 9, two posts 24 and 25, each having a pyramidal depression 26 and 27 in its lower face, are fixed to or formed integral with the upper block 28. The lower block 29 has two posts 30 and 31 fixed to or formed integral therewith. The post 30 has a groove 32 extending across its upper face and having plane convergent sides. The post 31 has a triangular pyramidal depression 33 therein. A spherical element 34 frictionally engages the plane surfaces of the depression 26 and of the groove 32. A second spherical element 35 frictionally engages the plane surfaces of the depressions 27 and 33. A tensioned spring 36 holds the blocks 28 and 29 together. The modification of Fig. 9 operates in the same manner as the previously described embodiments except that the spherical elements 34 and 35 are free to turn relative to either or both of the blocks.

My improved pivot bearing in any of its modifications may be used in a wide variety of mechanisms. It is particularly applicable to precision instruments involving multiplying levers having arms of unequal length. One such application has been illustrated in Fig. 8. As there shown, one block 37 of one of my improved pivot bearings B is secured to a base 38, and the other block 39 carries a lever L. The short arm 40 of the lever L terminates in a downwardly disposed finger 41, and the long arm 42 thereof terminates in a pointer 43 which registers with a scale 44 secured to the base 38. A part 45, the thickness of which is to be measured, is carried by a block 46 on the base 38 beneath the finger 41. Slight variations in the thickness of the part 48 are considerably multiplied by the lever L and can be read on the scale 44. My improved pivot bearing insures smooth and accurate turning of the lever about a fixed line axis. After extended use, the plane sides of the recesses engaged by the spherical elements of my bearing may become slightly worn but this wear appears in the form of spherical depressions in these plane sides and does not interfere with the accurate movement of the bearing about its axis.

I claim:

1. A pivot bearing comprising a pair of relatively movable adjacent parts and means forming a pivot joint between said parts comprising a recess in either one of said parts in the form of a depression having three convergent plane sides, a recess in either one of said parts in the form of a groove substantially aligned with and spaced from said depression, a pair of spherical elements respectively engaging said recesses and means for preventing lateral movement of each of said spherical elements relative to the part opposite that bearing the recess which said element engages.

2. A pivot bearing comprising a pair of relatively movable parts having oppositely disposed adjacent faces, and means forming a pivot joint between said parts comprising a recess in the face of either one of said parts in the form of a plane sided triangular pyramidal depression, a recess in the face of either one of said parts in the form of a groove substantially aligned with and spaced from said depression and having plane angularly disposed sides, a spherical element engaging the sides of said depression, a spherical element engaging the sides of said groove and means for preventing lateral movement of each of said spherical elements relative to the face of the part opposite that bearing the recesses which such spherical element engages.

3. A pivot bearing comprising a pair of relatively movable parts having oppositely disposed adjacent faces, and means forming a pivot joint between said parts comprising a recess in the face of either one of said parts in the form of a depression having three convergent plane sides, a recess in the face of either one of said parts in the form of a groove substantially aligned with and spaced from said depression and having plane angularly disposed sides, a spherical element engaging the sides of said depression, a spherical element engaging the sides of said groove and means for preventing lateral movement of each of said spherical elements relative to the face of the part opposite that bearing the recesses which such spherical element engages.

4. A pivot bearing comprising a pair of relatively movable parts having oppositely disposed adjacent faces and means forming a pivot joint between said parts comprising a recess on either one of said faces in the form of a depression having three convergent plane sides, a recess on either one of said faces comprising a groove substantially aligned with and spaced from said depression, a pair of spherical elements respectively engaging said recesses and means for securing each of said elements to the face opposite that carrying the recess which said element engages.

5. A pivot bearing comprising a pair of relatively movable parts having oppositely disposed adjacent faces and means forming a pivot joint between said parts comprising a recess on either one of said faces in the form of a triangular pyramidal depression, a recess on either one of said faces comprising a groove substantially aligned with and spaced from said depression and having plane convergent sides, a pair of spherical elements respectively engaging said recesses and means for securing each of said elements to the face opposite that carrying the recess which said element engages.

6. A pivot bearing comprising a pair of parts, a pair of spaced recesses on one of said parts, one of said recesses comprising a depression having three convergent plane sides and the other of said recesses comprising a groove substantially aligned with said depression, and a pair of spherical elements respectively engaging said recesses and fixed to the other of said parts.

7. A pivot bearing comprising a pair of parts having oppositely disposed adjacent faces, a pair of spaced recesses on one of said faces, one of said recesses comprising a triangular pyramidal depression and the other of said recesses comprising a groove substantially aligned with said depression and having plane convergent sides, a pair of spherical elements respectively engaging said recesses and fixed to the other of said faces and flexible means connected between said parts for holding the same together.

8. A pivot bearing comprising a pair of parts having oppositely disposed adjacent faces, a depression in one of said faces having three convergent plane sides, a groove in the other of said faces spaced from and substantially aligned with said depression, a spherical element engaging the sides of said depression and fixed to the face opposite that in which said depression is formed, and a spherical element engaging said groove and fixed to the face opposite that in which said groove is formed.

9. A pivot bearing comprising a pair of parts having oppositely disposed adjacent faces, a triangular pyramidal depression in one of said faces, a groove in the other of said faces spaced from and substantially aligned with said depression and having plane convergent sides, a spherical element engaging the sides of said depression and fixed to the face opposite that in which said depression is formed, a spherical element engaging the sides of said groove and fixed to the face opposite that in which said groove is formed, and flexible means connected between said parts to hold them together.

10. A pivot bearing comprising a pair of parts having oppositely disposed adjacent faces, a pair of spaced depressions in one of said faces each having three convergent plane sides, a depression in the other of said faces having three convergent plane sides, a groove in said other of said faces spaced from and substantially aligned with said depression therein, a spherical element engaging one of said depressions in said one of said faces and said depression in said other of said faces, and another spherical element engaging the other of said depressions in said one of said faces and said groove in said other of said faces.

11. A pivot bearing comprising a pair of parts having oppositely disposed adjacent faces, a pair of spaced triangular pyramidal depressions in one of said faces, a triangular pyramidal depression in the other of said faces, a groove in said other of said faces spaced from and substantially aligned with said depression therein and having convergent plane sides, a spherical element engaging one of said depressions in said one of said faces and said depression in said other of said faces, another spherical element engaging the other of said depressions in said one of said faces and the sides of the said groove in said other of said faces, and a tensioned spring connected between said parts to hold them together.

WINSLOW S. PIERCE, Jr.